June 26, 1956 C. W. BAUER 2,751,743
SNAPPING ROLLS HAVING TRASH REMOVING MEANS
Filed May 13, 1953 2 Sheets-Sheet 1
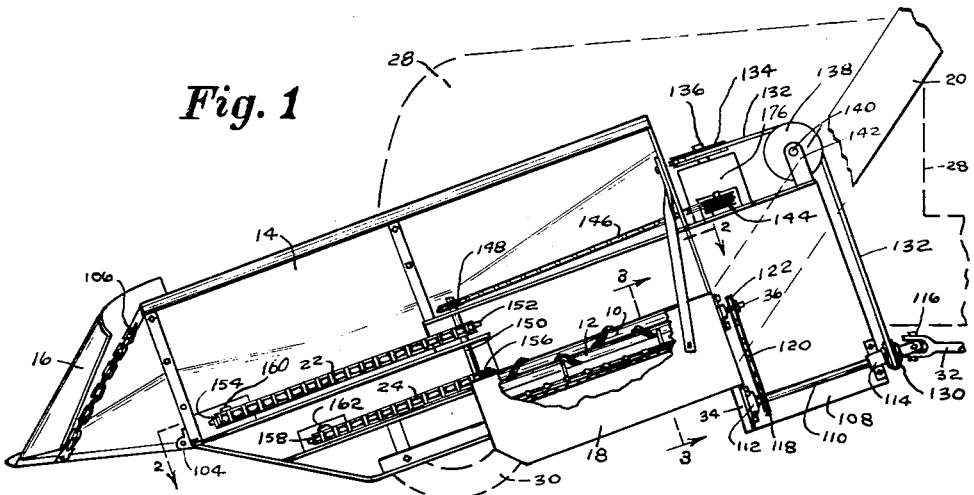
Fig. 1
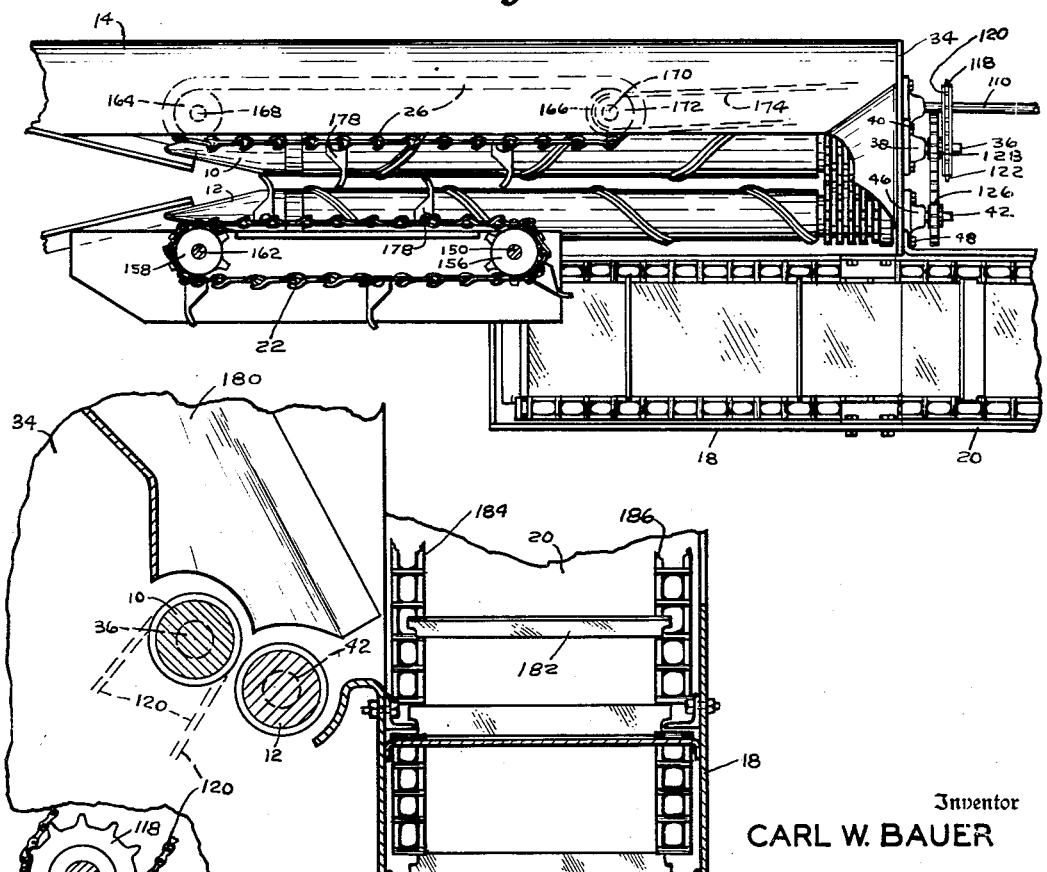
Fig. 2.
Fig. 3.
Inventor
CARL W. BAUER
By Arthur H. Sturges Attorney June 26, 1956  C. W. BAUER  2,751,743
SNAPPING ROLLS HAVING TRASH REMOVING MEANS
Filed May 13, 1953  2 Sheets-Sheet 2
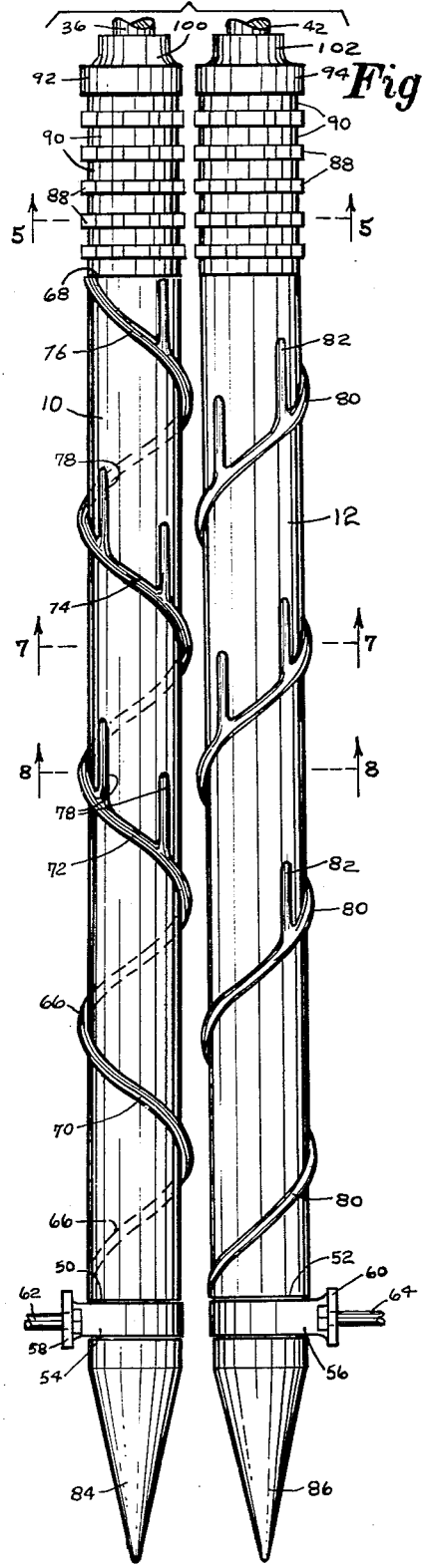
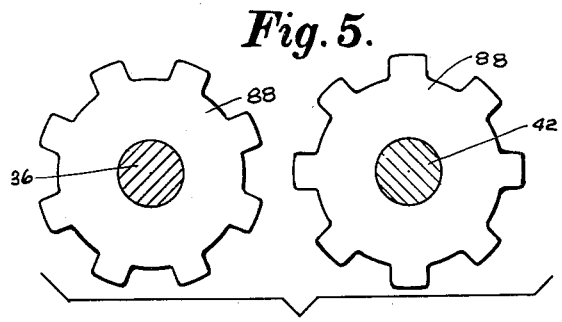
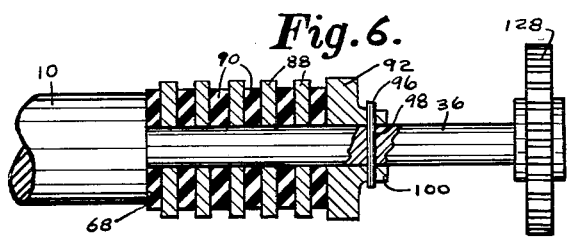
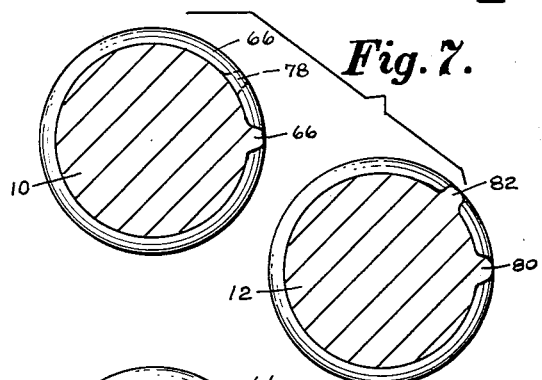
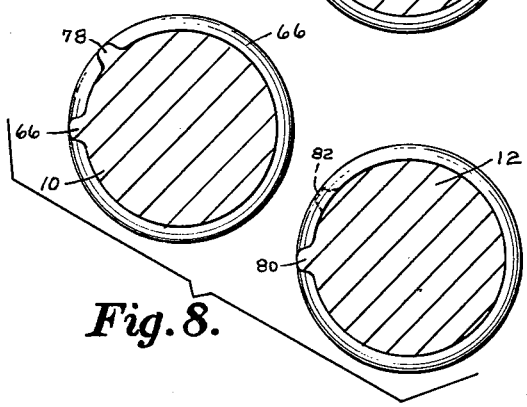
Inventor
CARL W. BAUER
By Arthur H. Sturges
Attorney United States Patent Office 2,751,743
Patented June 26, 1956

2,751,743

SNAPPING ROLLS HAVING TRASH REMOVING MEANS

Carl W. Bauer, Hildreth, Nebr.

Application May 13, 1953, Serial No. 354,821

2 Claims. (Cl. 56—104)

This invention relates to corn harvesting equipment, and in particular improvements in corn pickers which are generally inefficient because debris, trash, broken corn stalks, weeds and the like roll up into balls between the oppositely rotating snapping rolls and hinder free passage of ears of corn snapped by the rolls from corn stalks passing through the machine from the rolls to the elevator of the machine, and the improvements of this invention arrange the snapping rolls and pattern the spiral ridges thereon whereby with longitudinally positioned ribs used in combination with the convolutions the balling of the debris and the like is substantially eliminated.

The purpose of this invention is to eliminate the necessity of the operator of a corn picker stopping the machine and working debris and the like out of the snapping rolls of the machine.

Removing the debris and the like from snapping rolls of corn pickers is a hazardous task and hands and arms of numerous operators have been injured by the rolls drawing the hands and arms therebetween while attempting to loosen and remove the debris and particularly corn stalks and brush.

With this thought in mind this invention contemplates positioning the snapping rolls of corn pickers whereby one roll is positioned slightly above the other and wherein the convolutions of the ridges on the rolls are alternated and provided with longitudinally disposed ribs wherein ears of corn being snapped from corn stalks are first moved laterally to break the stems from the stalks by the upper roller and then conveyed longitudinally by the alternately disposed ridges without danger of the ears being crushed or otherwise damaged by being caught between opposed ridges on the surfaces of the rolls.

The object of this invention is, therefore, to pattern and position snapping rolls of a corn picker so that ears of corn may readily be snapped from corn stalks and whereby debris and the like is continuously worked through the rolls to the ground below.

Another object of the invention is to provide improved snapping rolls for corn pickers in which the improved rolls are adapted to be installed in corn pickers of the conventional type.

Another important object of the invention is to provide means for forming the spiral ridges on the surfaces of corn picker rolls and also means for positioning the rolls whereby corn stalks, broken leaves, trash and the like is thrown toward the sides of the rolls and comparatively clean ears of corn are conveyed backwardly to elevators at the rear ends of the rolls.

A further object of the invention is to provide snapping rolls for corn picking machines in which spiral ridges on the surface of one roll mesh with corresponding ridges on the surface of another roll so that corn stalks are not pinched between the ridges of the rolls whereby the leaves are not readily stripped from the stalks and the stalks carry the leaves through the rolls and to the ground.

A still further object is to provide obstructions at the sides of ridges of snapping rolls of a corn picker whereby instead of the spiral ridges sliding through accumulations of trash, leaves and the like, longitudinally disposed ribs, which form the obstructions push the trash and the like through the rolls, depositing the same upon the ground.

And a still further object of the invention is to provide self cleaning snapping rolls for corn pickers in which the rolls and mounting elements are of simple and economical construction.

With these and other objects and advantages in view, the invention embodies a two row corn picker of the tractor mounted type in which spaced pairs of snapping rollers are mounted in inclined positions with the inner roller of each pair positioned in a plane above that of the outer roller and with the convolutions of the spiral ridges of the rollers alternated and provided with spaced longitudinally disposed ribs.

Other features and advantages of the invention will appear from the following description taken in connection with the drawings, wherein:

Figure 1 is a side elevational view illustrating the corn picker attachment with parts broken away to show the snapping rollers and with a portion of a tractor on which the attachment is mounted, shown in broken lines.

Figure 2 is a plan view of the corn picker showing the elements on one side of the center with the parts on the opposite side of the center omitted, with the parts shown on an enlarged scale and with the ends of the parts broken away, said view being taken substantially on line 2—2 of Figure 1.

Figure 3 is a cross section through one side of the picker taken on line 3—3 of Figure 1, with the parts shown on a further enlarged scale, illustrating the staggered arrangements of the snapping rollers and also showing the receiving box for ears of corn and the elevator elements at one side of the picker.

Figure 4 is a detail illustrating the construction and arrangement of the snapping rollers, the rollers being shown on a still further enlarged scale.

Figure 5 is an enlarged cross section through the upper ends of the snapping rollers taken on line 5—5 of Figure 4, illustrating the inter-meshing lug wheels provided on the upper ends of the rollers.

Figure 6 is a detail showing a longitudinal section through the upper or rear end of one of the snapping rollers illustrating the alternating arrangement of the lug wheels and spacing rubber discs.

Figure 7 is a cross section through the snapping rollers taken on line 7—7 of Figure 4 showing the relative positions of the rollers, spiral ridges, and longitudinally positioned ribs at this point on the rollers, the parts being shown on a still further enlarged scale.

Figure 8 is a section, similar to that shown in Figure 7, taken on line 8—8 of Figure 4, showing the relative positions of the parts at this point on the snapping rollers.

Referring now to the drawings wherein like reference characters denote corresponding parts the corn harvesting mechanism of this invention includes spaced pairs of cylindrical bodies or snapping rollers, such as the rollers 10 and 12, one pair of rollers only being shown in the drawings as the pairs are similar, side walls 14 having arcuate upper edges extended longitudinally of the rollers and positioned with the upper edges curving inwardly toward the center between the rollers, pointed hoods 16 carried by and extended forwardly from the leading ends of the side walls, receiving boxes 18 positioned at one side of the rear ends of the rollers and adapted to feed ears of corn to elevators 20.

The rollers which are closest to their respective elevators are positioned lower than the other rollers as best shown in Figure 3 for causing ears of corn harvested by the rollers to fall downwardly from the upper ends of the rollers and into the elevators respectively whereby said ears are conveyed upwardly and rearwardly with respect to the machine. Gathering chains 22 and 24 on one side and 26 on the opposite side of each pair of rollers, and suitable mounting and transmission elements, not shown, whereby the corn picker attachment is installed on and operated by a tractor as indicated by the broken lines 28, in Figure 1. The broken lines 30 indicate the front wheels of the tractor and the shaft 32 the power take-off shaft thereof.

The ends of the snapping rollers at the trailing end or rear of the attachment are supported by a transversely positioned plate 34 with a shaft 36 extending from the end of the roller 10 journaled in a bearing 38 secured to the plate 34 with bolts 40, and a shaft 42 extended from the end of the roller 12 journaled in a bearing 46 that is secured to the plate 34 with bolts 48. The diameter of the shafts 36 and 42 is less than that of the snapping rollers, as shown in Figure 6. The leading ends of the snapping rollers are provided with annular recesses 50 and 52 by which the rollers are journaled in bearings 54 and 56, respectively, and the bearings, which are provided with flanges 58 and 60 are secured by bolts 62 and 64 to the bed of the picker.

The roller 10 is provided with a continuous spiral ridge 66 which extends from the recess 50 to a shoulder 68 at the intersection of the roller with the shaft 36 and, for the purpose of illustration, the ridge 66 is divided into convolutions 70, 72, 74, and 76. Beginning at the second convolution, 72, and continuing through the following convolutions 74 and 76, the roller is provided with four equally spaced longitudinally disposed ribs, as indicated by the numeral 78, in each convolution, the said ribs extending from the ridge rearwardly and providing lugs or projections on the surfaces of the rollers.

The roller 12 is provided with a similar spiral ridge, as indicated by the numeral 80, and ribs 82 are provided in the second, third and fourth convolutions. The leading ends of the rollers are formed with points 84 and 86, respectively, and the shafts 36 and 42, at the opposite ends are provided with alternately positioned lug wheels 88 and rubber discs 90, which are secured in position with flanges 92 and 94, the flanges being held with pins 96 extended through apertures 98 in the shafts, and aligned openings in hubs 100 and 102 of the flanges 92 and 94, respectively. Although the discs 90 are described as being formed of rubber it will be understood that other suitable resilient material may be used. The lug wheels 88 force the trash, such as corn stalks, leaves and the like downwardly through the rollers whereby the trash and the like is deposited upon the ground below the machine.

The hoods 16 are pivotally connected by hinges 104 to the leading ends of the side walls 14 of the bed of the machine, and the positions of the hoods are adjusted by the chains 106.

A mounting plate 108 is provided at the rear of the bed and a shaft 110, which is journaled in bearings 112 and 114 on the lower end of the plate, is connected by a universal joint 116 to the take-off shaft 32 extended from the tractor. The shaft 110 is provided with a sprocket 118 and a chain 120 which is trained over the sprocket 118 and also over a sprocket 122 on the shaft 36 of the snapping roller 10 provides means for driving the roller 10 from the shaft 110. By this means the sprocket 118 and the roller 10 are rotated in the direction of the arrow 124 as shown in Figure 3, and with a gear 126 on the shaft 42 of the roller 12 meshing with a gear 128 on the shaft 36 the roller 12 will rotate in a direction opposite to that of the roller 10.

The shaft 110 is also provided with a pulley 130, and a belt 132 trained over the pulley 130 and also over a pulley 134 on a stub shaft 136 provides means for driving the stub shaft and gathering chains which draw the corn stalks into the snapping rollers. The belt 132 is also trained over idler pulleys 138 on a shaft 140 which is supported in bearings 142.

The stub shaft 136 is also provided with a sprocket 144 and a chain 146 trained over the sprocket 144 and also over a sprocket 148 on a shaft 150 provides means for driving the gathering chains 22 and 24, the chain 22 being trained over a sprocket 152 on the shaft 150 and also over an idler sprocket 154, and the chain 24 being trained over a sprocket 156 on the shaft 150 and also over an idler sprocket 158. The sprocket 154 is journaled in the bed of the machine with a shaft 160 and the sprocket 158 with a shaft 162. The gathering chain 26 on the opposite side of the rollers 10 and 12 is trained over sprockets 164 and 166, the sprocket 164 being journaled in the device with a shaft 168 and the sprocket 166 with a shaft 170 on which a sprocket 172 is positioned, and the chain 26 is driven from the stub shaft 136 with a chain 174 that is trained over the sprocket 172 and also over a sprocket positioned in a casing 176 in which the shaft 136 is journaled, the sprocket in the casing not being shown.

The gathering chains 22, 24, and 26 are provided with fingers 178 which extend over the snapping rollers and drag or convey corn stalks and the like longitudinally of the rollers.

The structural elements of the mounting bed or frame are conventional so that they are not described in detail, and it will be understood that the snapping rollers and mounting and operating elements may be installed on a tractor by suitable means. With the parts designed and assembled in this manner corn stalks gathered up in the machine are stripped of ears of corn thereon and the stalks are thrown laterally whereas ears of corn stripped therefrom are fed rearwardly toward an arcuate deflection plate 180 by which the ears are directed into the receiving box 18 at the base of the elevator 20. The elevator is provided with flights 182 which are carried by chains 184 and 186 that extend through the receiving box 18.

By this means the trash, debris, broken corn stalks, weeds, and the like are separated from the ears of corn and thrown laterally from the sides of the snapping rollers, and there is very little possibility of this trash forming balls and the like on the rollers.

From the foregoing description it is thought to be obvious that a corn harvesting mechanism constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. In a pair of snapping rollers for use in a corn picker, the combination which comprises a pair of cylindrical bodies having conical-shaped points on leading ends thereof and shafts extended from the trailing ends, the leading ends of the bodies having annular recesses spaced inwardly from said conical-shaped points, bearing in said recesses and positioned to retain the rollers in spaced relation, the surfaces of said rollers having spiral ridges thereon and the convolutions of the ridges of one roller being positioned between adjacent convolutions of the ridges of the other roller, the surfaces of the rollers also having spaced longitudinally disposed ribs extended from the convolutions on the trailing portions of the rollers toward the trailing ends of the rollers, said ribs terminating at points positioned between the convolutions, each of said rollers having spaced lug wheels at the trailing end thereof and the outside diameters of the lugs being greater than the diameters of the rollers whereby the lugs of the lug wheels project beyond the peripheral surfaces of the rollers, discs of resilient material positioned between said lug wheels, said lug wheels and discs being positioned on the shafts extended from the trailing ends of the rollers, and the openings through said lug wheels and discs being circular whereby the discs of resilient material provide the only means for preventing rotation of the lug wheels so that the lugs grip stalks of corn from which ears have been removed with a resilient action snapping the stalks downwardly toward the ground, and means for retaining the lug wheels and discs in assembled relation on the shafts extended from the trailing ends of the rollers.

2. A pair of snapping rollers as described in claim 1, wherein the outer roller of the pair is positioned in a plane above a plane extended through the inner roller.

References Cited in the file of this patent

UNITED STATES PATENTS

| Number | Name | Date |
|---|---|---|
| 554,061 | Gundersen | Feb. 4, 1896 |
| 1,922,375 | Krause | Aug. 15, 1933 |
| 1,977,790 | Andrews | Oct. 23, 1934 |
| 2,333,901 | Swenson | Nov. 9, 1943 |
| 2,416,123 | Siemen | Feb. 18, 1947 |
| 2,569,175 | Karlsson | Sept. 25, 1951 |
| 2,634,731 | Karlsson | Apr. 14, 1953 |
| 2,636,330 | Krause | Apr. 28, 1953 |